(12) United States Patent
Jang et al.

(10) Patent No.: US 7,906,886 B2
(45) Date of Patent: Mar. 15, 2011

(54) AXIAL MOTOR

(75) Inventors: Jeong Cheol Jang, Gwangju (KR); Ji Min Lee, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 12/911,815

(22) Filed: Oct. 26, 2010

(65) Prior Publication Data

US 2011/0037335 A1 Feb. 17, 2011

Related U.S. Application Data (63) Continuation of application No. PCT/KR2009/000677, filed on Feb. 12, 2009.

(30) Foreign Application Priority Data

Jan. 19, 2009 (KR) ........................ 10-2009-0004350

(51) Int. Cl.
*H02K 1/22* (2006.01)
(52) U.S. Cl. .................. 310/268; 310/216.133
(58) Field of Classification Search .................. 310/268, 310/216.129–216.137, 216.88–216.94
See application file for complete search history.

(56) References Cited

U.S. PATENT DOCUMENTS

| | | | | |
|---|---|---|---|---|
| 3,243,621 | A * | 3/1966 | Wesolowski | 310/168 |
| 5,633,545 | A * | 5/1997 | Albrecht et al. | 310/67 R |
| 5,801,473 | A * | 9/1998 | Helwig | 310/216.061 |
| 6,157,112 | A * | 12/2000 | Suzuki et al. | 310/269 |
| 6,707,221 | B2 * | 3/2004 | Carl | 310/254.1 |
| 6,809,453 | B2 * | 10/2004 | Narita et al. | 310/216.008 |
| 7,173,357 | B2 | 2/2007 | Naito et al. | |
| 7,323,799 | B2 | 1/2008 | Naito et al. | |
| 7,592,733 | B2 * | 9/2009 | Naitou et al. | 310/216.058 |
| 7,800,277 | B2 * | 9/2010 | Kaminokado | 310/268 |
| 2003/0057796 | A1 * | 3/2003 | Fan et al. | 310/216 |
| 2005/0017596 | A1 | 1/2005 | Naito et al. | |
| 2005/0073213 | A1 | 4/2005 | Naito et al. | |

FOREIGN PATENT DOCUMENTS

| | | |
|---|---|---|
| JP | 2008-092735 | 4/2008 |
| KR | 10-2004-0058347 | 7/2004 |
| KR | 10-2004-0058356 | 7/2004 |

* cited by examiner

*Primary Examiner* — Thanh Lam
(74) *Attorney, Agent, or Firm* — Sherr & Vaughn, PLLC

(57) ABSTRACT

The present invention relates to an axial motor, and more specifically, to an axial motor which has a simple structure and is easily assembled by inserting and holding core teeth in core teeth insertion holes circularly arranged on a yoke. The axial motor according to the present invention includes: a stator having core teeth which are insulated by insulators, arranged in a ring-shaped pattern, and have a coil wound thereon; and a rotor having magnets which are arranged in a ring-shaped pattern to face the ends of the core teeth in an axial direction and are supported by the rotor axis at the center of the rotor to rotate relatively with respect to the stator. The stator comprises: a plate yoke with a donut shape having an open center, wherein the core teeth insertion holes are arranged along the circumference of the plate yoke; core teeth, each of the core teeth having one end formed with a core pole and the other end inserted into each of the core teeth insertion holes, thereby being vertically fixed to the yoke; core teeth insulators which are made of insulation materials and wrapped around the exterior of the core teeth in such a manner that the core poles and the other ends of the core teeth are not covered; and a coil wound around the core teeth which are wrapped in the core teeth insulators.

17 Claims, 9 Drawing Sheets

AXIAL MOTOR

CROSS REFERENCE TO PRIOR APPLICATIONS

This application is Continuation of PCT International Application No. PCT/KR2009/000677 (filed on Feb. 12, 2009) designating the United States, which claims priority to Korean Patent Application No. 10-2009-0004350 (filed on Jan. 19, 2009), which are all hereby incorporated by reference in their entirety.

TECHNICAL FIELD

The present invention relates to an axial motor, and more particularly, an axial motor having a simple structure and an easy assembly by inserting core teeth into core teeth insertion holes arranged in a ring shape in a yoke and fixed thereto.

BACKGROUND ART

In general, a motor is an apparatus for obtaining rotation power by converting electrical energy into mechanical energy. Such an electromotor is chiefly classified into an AC motor and a DC motor according to the type of a power supply supplied thereto. From among them, the AC motor is widely used in order to drive home appliances.

The motor includes a stator and a rotor. The motor is rotated by torque which is generated in the rotor by a rotating magnetic field generated when an AC current flows through armature windings having coils wound thereon.

In general, the motor is classified into a core type (or a radial type) having a cup (cylinder) structure and a coreless type (or an axial type).

The radial type motor has a structure in which magnetic circuits are symmetrical around its shaft in the radial direction. The radial type motor is advantageous in that axial vibration noise is small, torque is great, and efficiency is high, but is disadvantageous in that windings are difficult, the stator and the rotor have a complicate structure, and thinning is difficult.

Various forms of the axial motors have been developed in view of the above problems. However, the existing axial motors are disadvantageous in that they are not appropriate for mass production because the core teeth and the yoke are integrally formed and they have a complicate structure in which the core teeth are coupled to the yoke even in a structure in which the core teeth and the yoke are separated from each other.

DISCLOSURE OF INVENTION

Technical Problem

Accordingly, the present invention has been made in view of the above problems occurring in the prior art, and an object of the present invention is to provide an axial motor having a simple structure and an easy assembly by inserting core teeth into core teeth insertion holes arranged in a ring shape in a yoke and fixed thereto.

Technical Solution

To achieve the above object, an axial motor according to the present invention comprises a stator having core teeth, insulated from each other by insulators, arranged in a ring shape and coils wound on the core teeth and a rotor having magnets arranged in a ring shape to face the ends of the core teeth in an axial direction and supported by a rotor shaft at a central part of the rotor to relatively rotate around the stator. The stator comprises a yoke of a plate shape configured to have a doughnut shape having a central portion opened and to have core teeth insertion holes arranged in a ring shape along the circumference of the plate-shaped yoke, the core teeth, each configured to have core poles formed at the tip of one end and to have the other end inserted into each of the core teeth insertion holes and fixed to a yoke in an upright position, core teeth insulators made of insulating materials to cover respective exteriors of the core teeth so that the core poles and the other ends of the core teeth are exposed, and coils wound on the core teeth covered with the core teeth insulators.

Furthermore, in the axial motor according to the present invention, each of the core teeth is formed by stacking iron plates.

Furthermore, in the axial motor according to the present invention, the tip of the other end of the core tooth is cocked with the other end inserted into the core teeth insertion hole, thereby fixing the core tooth to the yoke.

Furthermore, in the axial motor according to the present invention, locking steps are formed in each of the core teeth insertion holes on the inlet side into which the other end of the core tooth is inserted, and locking jaws engaged with the locking steps are formed in the other end of the core tooth.

Furthermore, in the axial motor according to the present invention, the yoke is formed by stacking iron plates, and the locking steps are formed by making larger a hole, formed in the iron plates of the yoke stacked on the inlet side into which the other end of the core tooth is inserted, than a hole formed in the iron plates of the yoke stacked on the inlet side through which the tip of the other end of the core tooth is exposed.

Furthermore, in the axial motor according to the present invention, the yoke is formed by stacking iron plates.

Furthermore, in the axial motor according to the present invention, the yoke is formed by interconnecting a plurality of yoke pieces divided in an arc shape.

Furthermore, in the axial motor according to the present invention, concave grooves cut up and down are formed in one end of the circumferential direction of each of the yoke pieces, convex portions are formed in the other end of the circumferential direction of the yoke piece and engaged with the respective concave grooves, and neighboring yoke pieces are coupled together by cocking the iron plates of the yoke at a position where the neighboring yoke pieces come into contact with each other with the convex portions engaged with the concave grooves.

Furthermore, in the axial motor according to the present invention, the yoke is covered with and insulated by yoke insulators so that interiors of the core teeth insertion holes are exposed.

Furthermore, in the axial motor according to the present invention, a coupling portion is formed in each of the yoke pieces and protruded in the direction of the center, a coupling hole is formed at the tip of the coupling portion and penetrated in an axial direction, and the yoke insulators cover the interiors of the coupling portions and the coupling holes.

Furthermore, in the axial motor according to the present invention, the yoke insulators are formed by inserting and pressing resin with the neighboring yoke pieces combined together.

Furthermore, in the axial motor according to the present invention, the rotor comprises a rotor frame of a disk shape and axis coupling portions configured to have a serration assembled with a rotor shaft at the central part of the rotor and coupled with the central part of the rotor frame, and the magnets are attached in a ring shape to one side of the rotor frame to face the core poles of the core teeth.

Furthermore, in the axial motor according to the present invention, the rotor frame has reinforcement concave portions and reinforcement convex portions formed alternately and arranged in a ring shape around the axis coupling portions.

Furthermore, in the axial motor according to the present invention, a reinforcement plate of a disk shape is attached to the one side of the rotor frame to face the core poles of the core teeth.

Furthermore, in the axial motor according to the present invention, the rotor frame is formed by performing a press process on an iron plate.

Furthermore, in the axial motor according to the present invention, the rotor frame has through holes formed therein and arranged in a ring shape.

Furthermore, in the axial motor according to the present invention, blades are formed near the through holes and protruded in a direction to face the core teeth.

ADVANTAGEOUS EFFECTS

In the axial motor constructed as above according to the present invention, the core teeth are inserted into the core teeth insertion holes arranged in a ring shape in the yoke and fixed thereto. Accordingly, a motor having a simple structure and an easy assembly can be provided.

REFERENCE NUMBERS IN THE DRAWINGS INDICATE 10 stator
11 yoke
11a core teeth insertion hole
11b coupling portion
11c convex portion
11d concave groove
11e cocking
11f coupling hole
11g locking step
12 yoke insulator
13 core teeth
13a core pole
13b other end
13c locking jaw
13d cocking
14 core teeth insulator
15 coil
16 magnetic sensor terminal unit
17 power supply terminal unit
18 mounting hole
20 rotor
21 rotor frame
22 axis coupling portion
24 reinforcement plate
23 magnet

BEST MODE FOR CARRYING OUT THE INVENTION

Hereinafter, an axial motor according to the present invention is described in detail in connection with embodiments with reference to the accompanying drawings.

Figure 1:
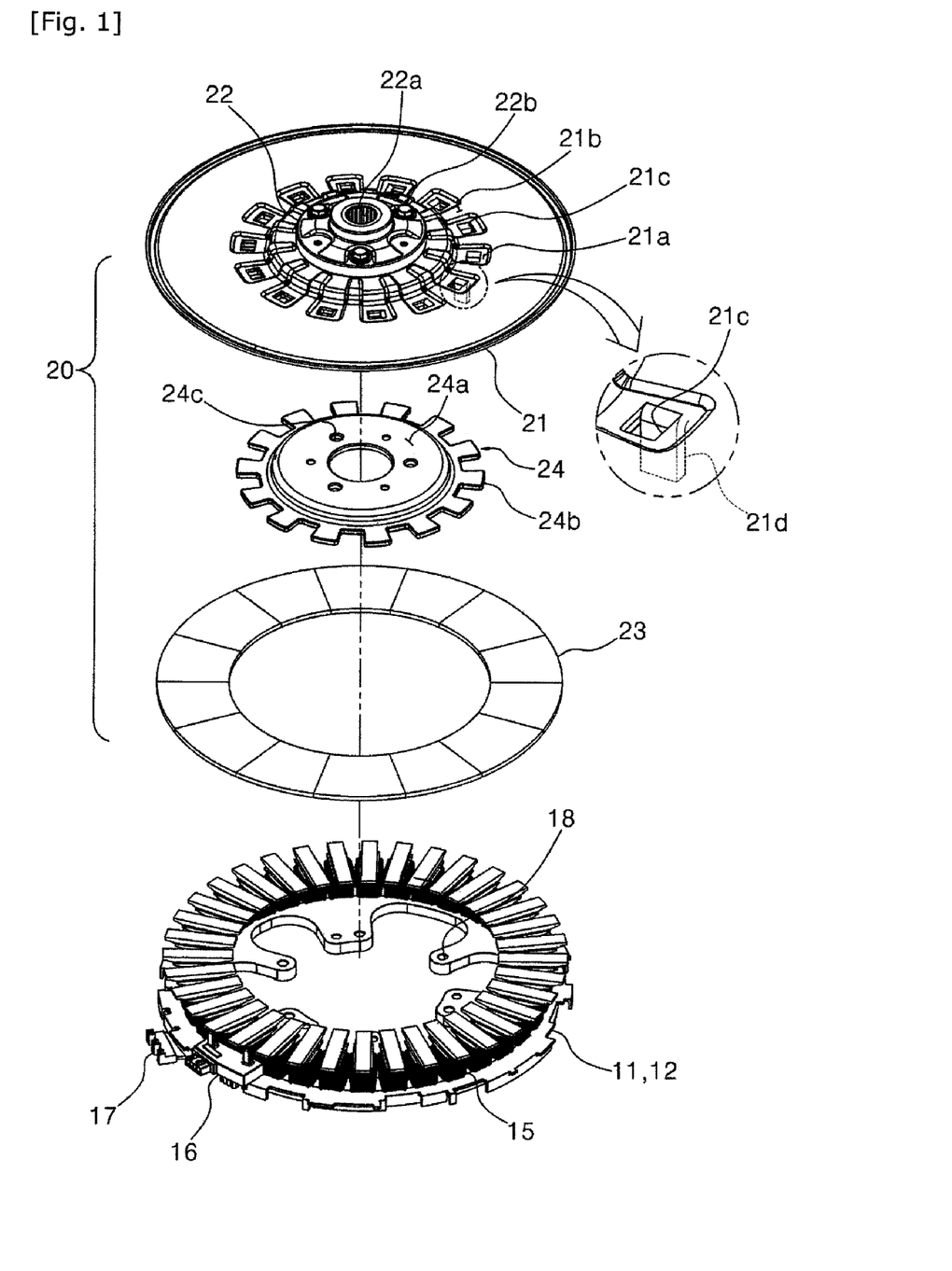
FIG. 1 is an exploded perspective view showing an axial motor according to an embodiment of the present invention.
Figure 2:
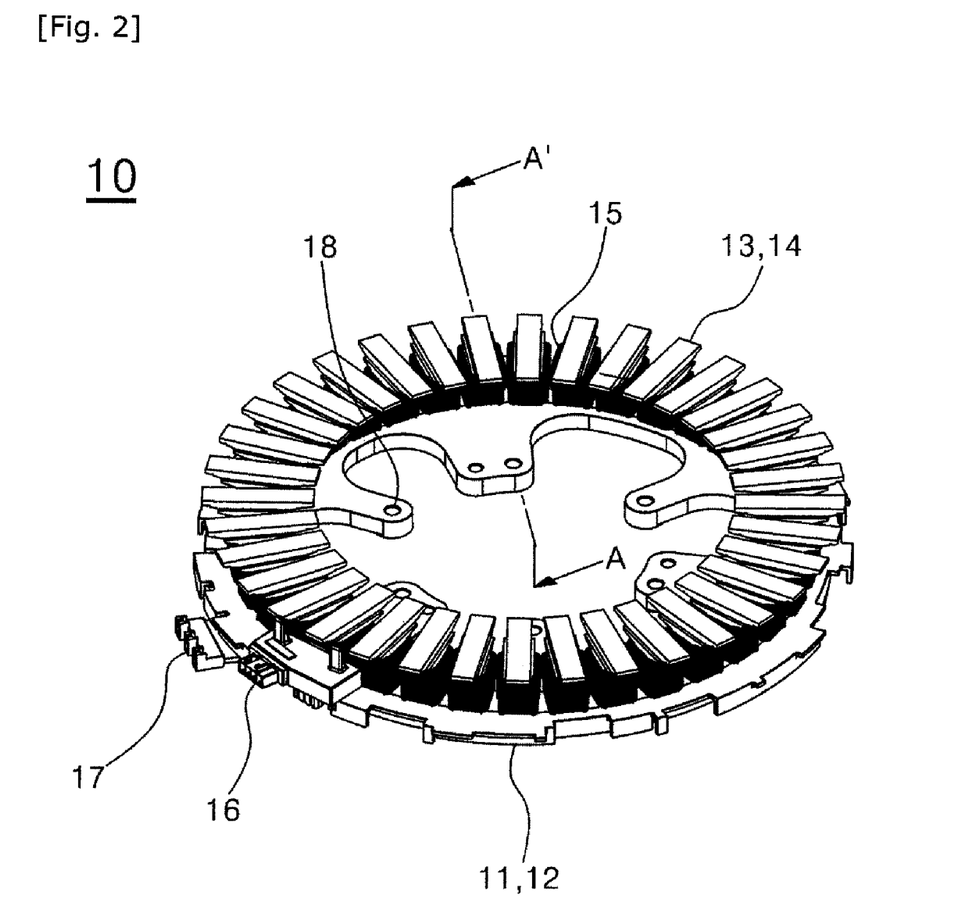
FIGS. 2 and 3 are perspective views showing the stator of the axial motor according to an embodiment of the present invention.
Figure 3:
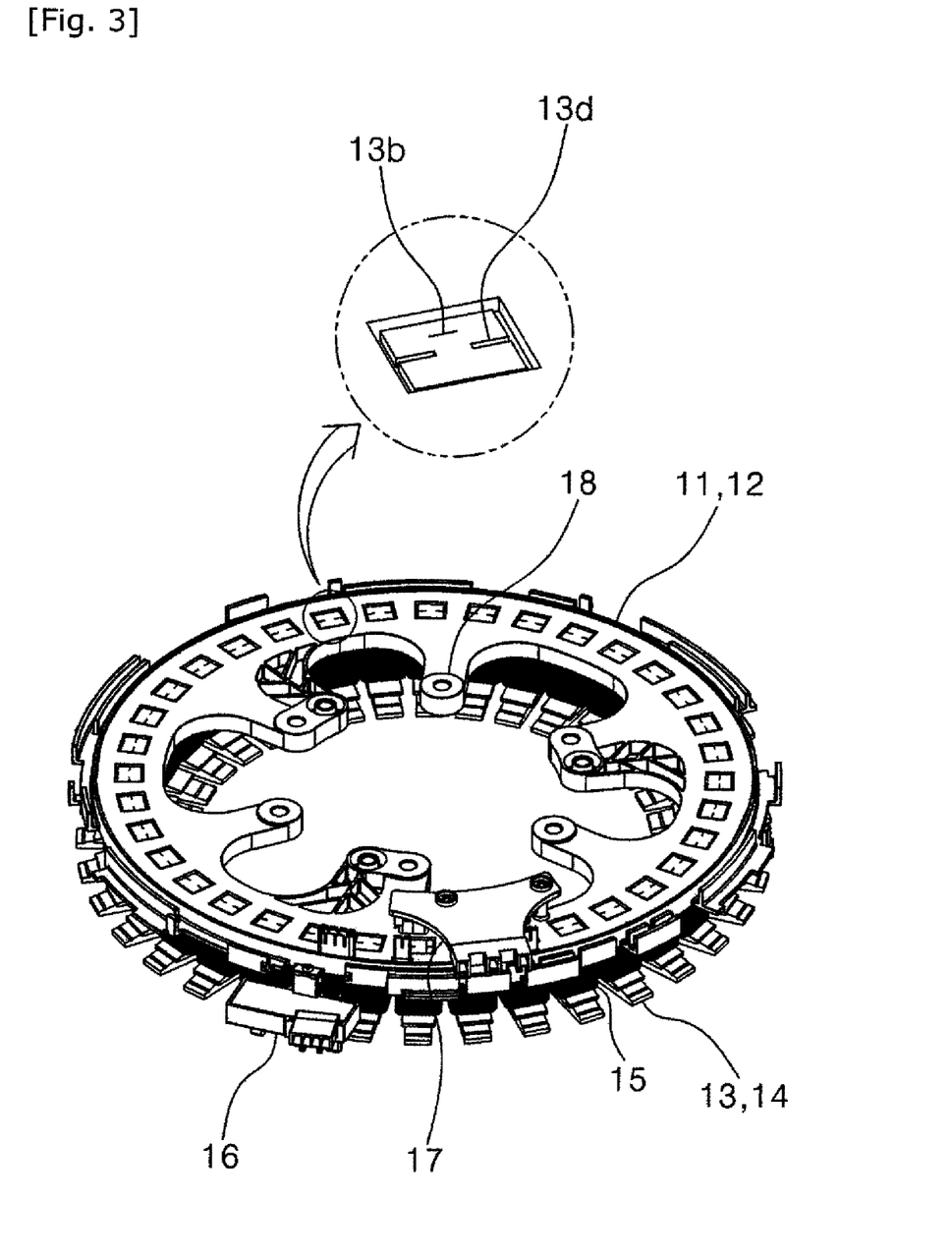
Figure 4:
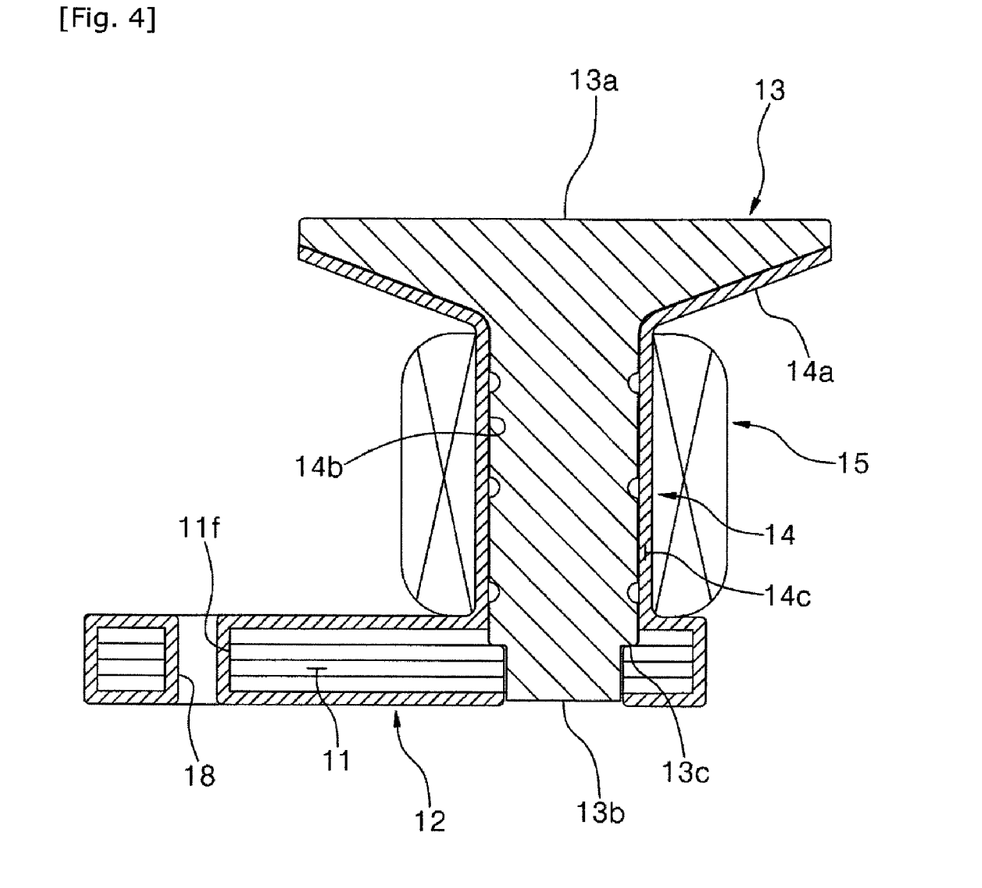
FIG. 4 is a cross-sectional view of A-A' in FIG. 2.
Figure 5:
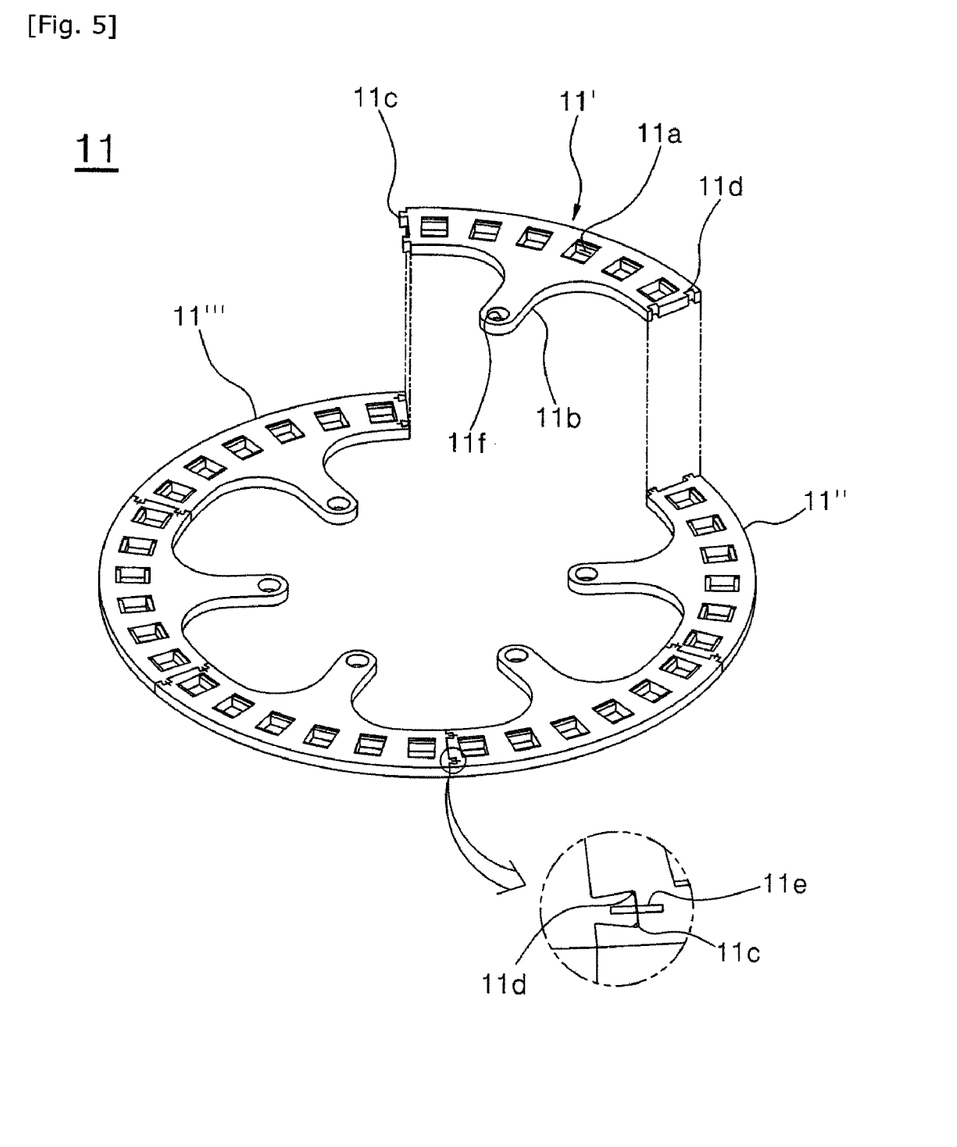
FIG. 5 is a perspective view showing a state in which the yoke and the yoke insulator of the stator of the axial motor are combined together according to an embodiment of the present invention.
Figure 6:
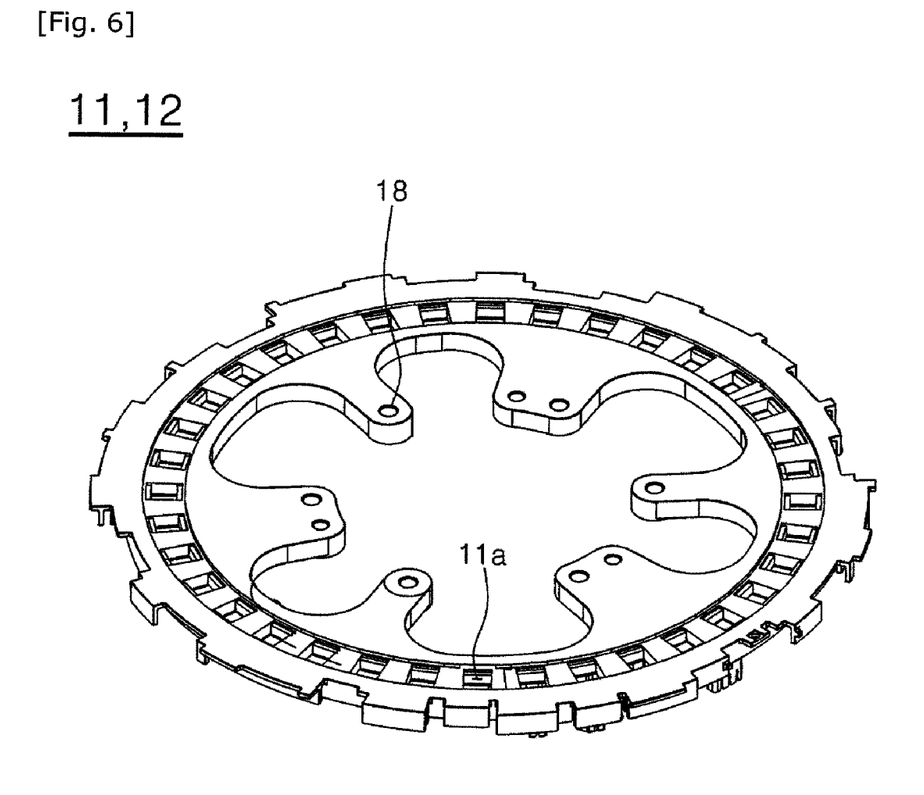
FIG. 6 is an exploded perspective view showing the yoke of the axial motor according to an embodiment of the present invention.
Figure 7:
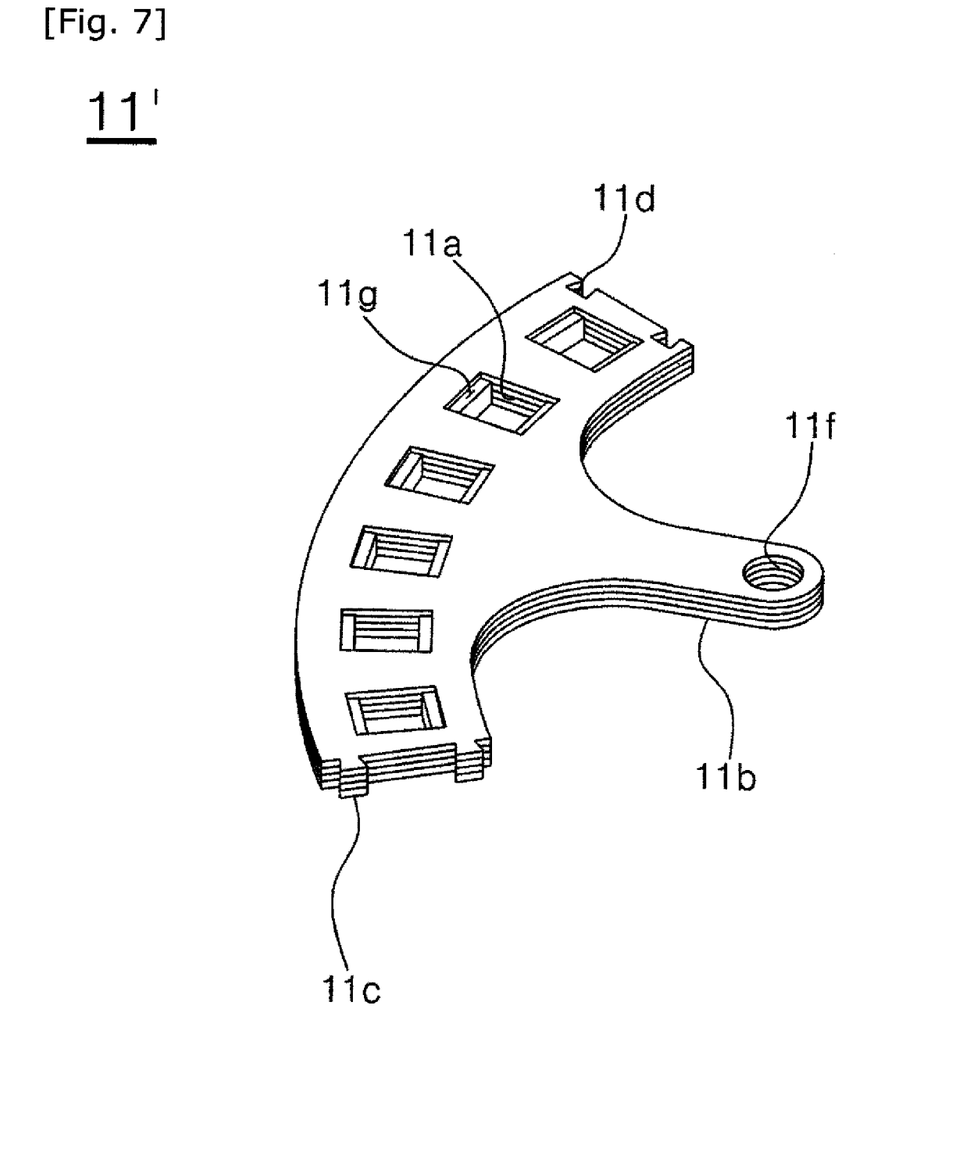
FIG. 7 is a perspective view showing the yoke piece of the axial motor according to an embodiment of the present invention.
Figure 8:
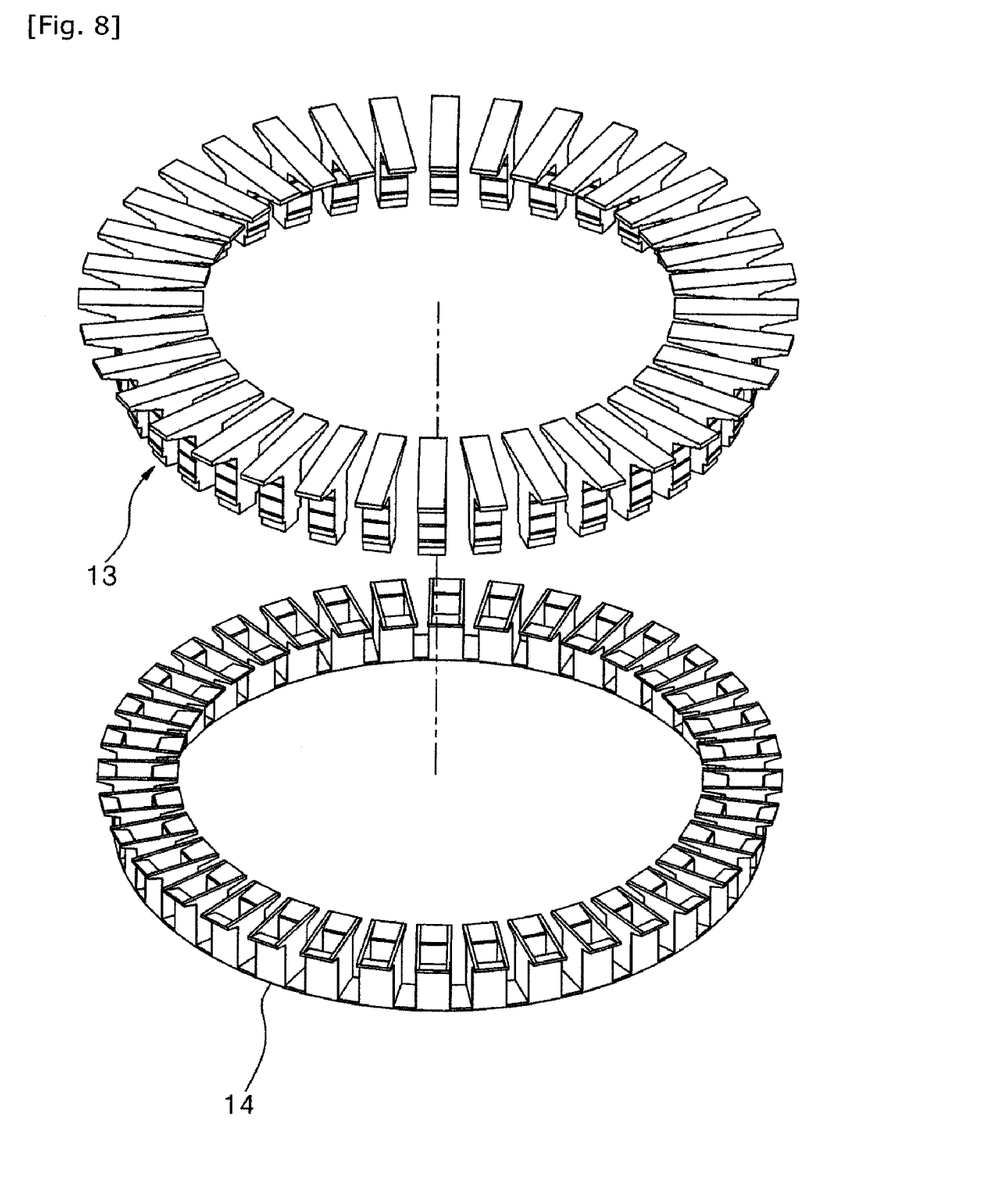
FIGS. 8 and 9 are exploded perspective views showing the core teeth and the core insulators of the axial motor according to an embodiment of the present invention.
Figure 9:
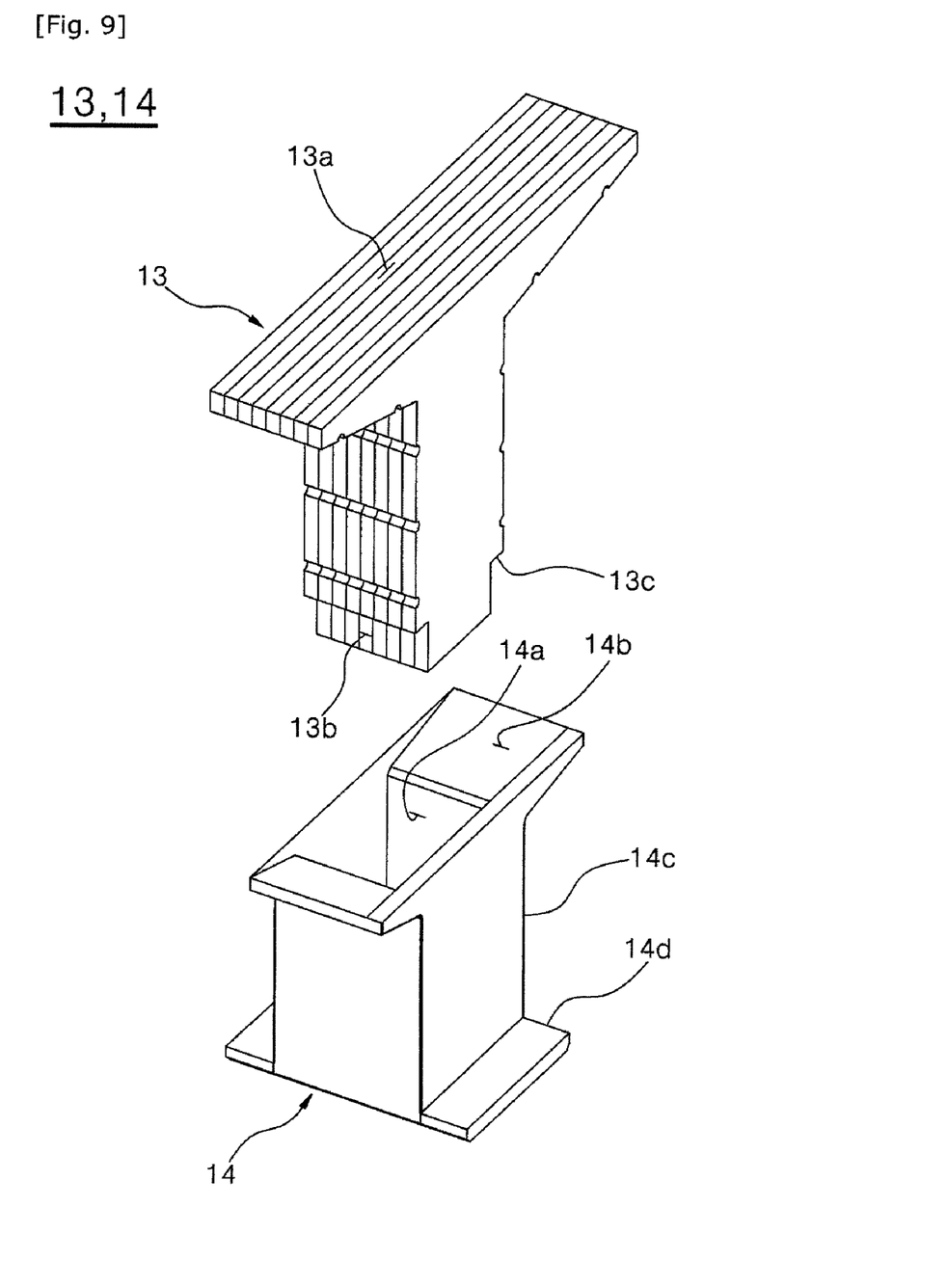

FIG. 1 is an exploded perspective view showing an axial motor according to an embodiment of the present invention. FIGS. 2 and 3 are perspective views showing the stator of the axial motor according to an embodiment of the present invention. FIG. 4 is a cross-sectional view of A-A' in FIG. 2. FIG. 5 is a perspective view showing a state in which the yoke and the yoke insulator of the stator of the axial motor are combined together according to an embodiment of the present invention. FIG. 6 is an exploded perspective view showing the yoke of the axial motor according to an embodiment of the present invention. FIG. 7 is a perspective view showing the yoke piece of the axial motor according to an embodiment of the present invention. FIGS. 8 and 9 are exploded perspective views showing the core teeth and the core insulators of the axial motor according to an embodiment of the present invention.

The axial motor according to the present invention includes a stator 10 and a rotor 20. The rotor 10 includes core teeth, insulated from each other by insulators and arranged in a ring shape, and coils wound on the core teeth. The rotor 20 is configured to have magnets arranged in a ring shape in an axial direction to the ends of the core teeth, supported by a rotor shaft at the center, and relatively rotated about the stator.

The stator 10 is mounted on a fixed structure and configured to have the coils wound thereon and to sequentially generate magnetic fields to the core teeth, arranged in a ring shape, using current flowing through the coils. Referring to the drawings, the stator 10 includes a yoke 11, yoke insulators 12, core teeth 13, core teeth insulators 14, coils 15, a magnetic sensor terminal unit 16, a power supply terminal unit 17, and mounting holes 18.

The yoke 11 forms a passage through which magnetic fields formed by the coils 15 wound on the core teeth 13 pass. The yoke 11 is formed of a plate-shaped member and configured to have a doughnut shape having its central portion opened. Core teeth insertion holes 11a are arranged in a ring shape along the edge of the yoke 11. Ends 13b on the opposite sides (i.e., the other ends) of one ends in which the core poles of the core teeth 13 are formed are inserted into the respective core teeth insertion holes 11a, thereby fixing the core teeth 13. Locking steps 11g are formed in each of the core teeth insertion holes 11a. Locking jaws 13c formed in the other end 13b of each of the core teeth 13 are inserted into the locking steps 11g and then engaged therewith. The yoke 11 is formed by stacking iron plates. The locking steps 11g are formed of steps. Here, the steps are formed by stacking by making larger a hole, formed in the iron plates of the yoke 11 stacked on the inlet side into which the other end 13b of the core tooth 13 is inserted, than a hole formed in the iron plates of the yoke stacked on the inlet side through which the tip of the other end 13b of the core tooth 13 is exposed. In other words, the core teeth insertion holes 11a are formed to communicate with each other in the iron plates for stacking the yoke 11. If the hole formed in the iron plates of the yoke 11 placed on the outermost side is larger than the hole formed in the remaining iron plates on the inlet side into which the other end 13b of the core tooth 13 is inserted, steps are generated by such stacking. The steps become the locking steps 11g. In a process of inserting the core tooth 13 into each of the core teeth insertion holes 11a, the locking jaws 13c of the core tooth 13 are engaged with the locking steps 11g. Accordingly, the core tooth 13 is inserted into the core teeth insertion hole 11a to a certain depth, thereby making the assembly easy.

As described above, the yoke 11 is formed by stacking the iron plates. If the yoke 11 is trimmed from the material iron plates, there is a problem in that the central portion and its surrounding portions of the material iron plates become scraps and are wasted. Accordingly, in the present invention, the yoke 11 is formed by connecting a plurality of yoke pieces 11', 11", and 11''', divided in an arc shape, in the form of a ring. That is, as shown in FIG. 6, the yoke 11 is divided into six yoke pieces and formed by connecting the six yoke pieces. The problem that the central portion and its surrounding portions of the material iron plates are wasted as scraps can be prevented by trimming the stacked iron plates for stacking the yoke pieces 11', 11", and 11''' from the material iron plates. In order to connect the neighboring yoke pieces 11' and 11" or 11' and 11''', concave grooves 11d up and down cut in one end of a circumferential direction are formed in each of the yoke pieces 11', 11", and 11''', and convex portions 11c engaged with the concave grooves 11d are formed in the other end of the circumferential direction. It is preferred that the inlets of the concave grooves 11d be narrow and the tips of the convex portions 11c be wide so that they are not separated from each other by external force in a radial direction with them engaged with each other. Meanwhile, in the state in which the convex portions 11c are inserted into and coupled to the concave portions 11d as described above, if the iron plate of the yoke 11 is deformed (i.e., cocked 11e) using a sharp tool, such as a chisel, at the boundary portion where the neighboring yoke pieces 11' and 11" or 11' and 11''' come into contact with each other, the boundary portions are interconnected.

The stator 10 is mounted on a fixed structure as described above. In order to mount the stator 10 on the fixed structure, the mounting holes 18 to which bolts (not shown in the drawings) are fastened are formed in the stator 10. The yoke 11 is formed of the iron plates with a relatively high strength. Thus, according to the present invention, coupling holes 11f for forming the respective mounting holes 18 are formed in the yoke 11 and surrounded by the yoke insulators 12, thus forming the mounting holes 18. Referring to the drawings, a coupling portion 11b protruded in the direction of the center is formed in each of the yoke pieces 11', 11", and 11''', and the coupling hole 11f penetrated in the axial direction is formed at the tip of the coupling portion 11b. The yoke insulator 12 covers the interiors of the coupling portion 11b and the coupling hole 11f and insulates them.

The yoke insulators 12 are configured to cover and insulate the remaining portions other than the interiors of the core teeth insertion holes 11a of the yoke 11 so that the interiors of the core teeth insertion holes 11a are exposed. The core teeth insertion hole 11a is not insulated so that it is magnetically connected to the other end 13b of the core teeth 13 inserted therein. The yoke insulators 12 are made of resin of insulating materials. In the present invention, the yoke insulators 12 can guarantee sure insulation and also reinforce the connection of the yoke pieces 11', 11", and 11''' because the resin is inserted and molded in the state in which the neighboring yoke pieces 11' and 11" or 11' and 11''' are combined together to form the yoke 11 of a ring shape.

Each of the core teeth 13 is configured to form a magnetic pole by means of a magnetic field generated by the coil 15 wound on its barrel. The core tooth 13 is inserted into each of the core teeth insertion holes 11a in an upright position and fixed thereto. Referring to the drawings, core poles 13a are formed at the end on one side of the core tooth 13, and the end on the other side (i.e., the other end 13b) of the core poles 13a is inserted into the core teeth insertion hole 11a. Thus, the core tooth 13 is fixed to the yoke 11 in an upright position. The core tooth 13 is inserted into the core teeth insertion hole 11a and magnetically coupled to the yoke 11. As described above, the locking jaws 13c are formed in the other end 13b of the core tooth 13, and the locking steps 11g formed at the inlet edge of the core teeth insertion hole 11a of the yoke 11 are engaged with the locking jaws 13c. Referring to the drawings, the core poles 13a of the core tooth 13 are inward and outward protruded and formed in a radial direction so that the area to face magnets 23 provided in the rotor 20 is increased.

Each of the core insulators 14 is configured to insulate the core tooth 13 and the coil 15 wound thereon. The core insulator 14 covers the exterior of the core tooth 13 so that the core poles 13a and the other end 13b of the core tooth 13 are exposed. Referring to the drawings, the core insulator 14 is formed to approximately cover the exterior of the core tooth 13. Expansion portions 14b are formed on one side of the barrel unit 14c of the core insulator 14 and configured to surround the barrel of the core tooth 13. The expansion portions 14b are expanded to correspond to the shape of the core poles 13a and to surround the other side of the core poles 13a. Flange portions 14d are formed on the other side of the barrel unit 14c and curved left and right from the barrel unit 14c. Further, a core teeth accommodation hole 14a is formed in the core insulator 14 so that it penetrates the core insulator 14 up and down. The other end 13b of the core tooth 13 is inserted into the core teeth accommodation hole 14a on the side of the expansion portions 14b and then coupled to the core insulator 14 so that the other end 13b of the core tooth 13 is exposed on the side in which the flange portions 14d are formed.

Meanwhile, each of the core teeth 13 is formed by stacking the iron plates. In the state in which the other end 13b of the core tooth 13 formed by stacking the iron plates as described above has been inserted into the core teeth insertion hole 11a, the tip of the other end 13b is deformed by cocking (13d) the tip and thus the core tooth 13 is coupled to the yoke 11.

The coil 15 generates electric fields by means of the flow of current when the current is supplied thereto. The coil 15 is wound on the core tooth 13 covered with the core teeth insulator 14. Referring to the drawings, the coil 15 is wound on the barrel unit 14c of the core insulator 14 and supported by the expansion portions 14b and the flange portions 14d so that it is not deviated outside the barrel unit 14d. A plurality of the coils 15 is alternately wound on the core tooth 13 depending on a power supply supplied thereto. For example, in the case of a motor driven by a 3 phase source, three coils 15 corresponding to the respective phases are alternately wound on the core teeth 13. Both sides of the coil wound on the core tooth 13 are electrically connected to the external power supply terminal and the common terminal of the power supply terminal unit 17.

The magnetic sensor terminal unit 16 is equipped with a magnetic sensor (so called a hall sensor) for detecting a magnetic pole of the magnets 23 provided in the rotor 20 when the rotor 20 is rotated. The magnetic sensor terminal unit 16 is mounted on the yoke insulators 12. The phase of current applied to the coil 15 is controlled depending on a magnetic pole detected by the magnetic sensor.

The power supply terminal unit 17 is configured to connect the coils 15 and the external power supply. The power supply terminal unit 17 can be equipped with a control circuit for controlling the flow of current, supplied to the coils 15, in response to a magnetic pole signal detected by the magnetic sensor terminal unit 16.

The mounting hole 18 has a bolt (not shown in the drawings) inserted therein in order to mount the stator 10 on a fixed structure. The mounting hole 18, as described above, is formed in such a manner that the coupling hole 11*f* formed in the yoke 11 is surrounded by the yoke insulator 12.

The rotor 20 is supported by the shaft and configured to relatively rotate around the stator 10. Referring to the drawings, the rotor 20 includes a rotor frame 21, axis coupling portions 22, the magnets 23, and a reinforcement plate 24.

The rotor frame 21 is configured to have the magnets 23 attached on its one side and to have a disk shape. The rotor frame 21 is formed by performing a press process on an iron plate, thus having a structure of guaranteed strength and easy manufacture. Furthermore, in order to reinforce the strength, a rim is formed in the rotor frame 21 by curving the fringe of the rotor frame 21, and reinforcement concave portions 21*a* and reinforcement convex portions 21*b* are alternately formed and arranged in a ring shape around the axis coupling portions 22 coupled to a central part of the rotor 20. Furthermore, through holes 21*c* are arranged in a ring shape in the rotor frame 21 and configured to discharge heat generated from the stator 10 facing the rotor 20. Furthermore, blades 21*d* are formed near the respective through holes 21*c* of the rotor frame 21 and protruded in a direction to face the core teeth 13 (i.e., a direction toward the stator 10) so that air can pass through the gap between the rotor 20 and the stator 10. In particular, each of the blades 21*d* is formed by curving a portion, blanked in a process of forming the through hole 21*c*, in the direction of the stator 10.

The axis coupling portions 22 are configured to connect the rotor frame 21 to a rotor shaft (not shown in the drawings). Referring to the drawings, a serration 22*a* with which the rotor shaft (not shown in the drawings) is assembled is formed at a central part of the disk shape. Thus, the axis coupling portions 22 are seated on a top surface of a central part of the rotor frame 21 and coupled to the rotor frame 21 by bolts 22*b*.

The magnets 23 are provided to correspond to the core poles 13*a* of the core teeth 13, thus forming magnetic fields. The magnets 23 are formed by circularly arranging and attaching magnet pieces of a fan shape, facing the core poles 13*a* of the core teeth 13, on one side of the rotor frame 11.

The reinforcement plate 24 is added to the rotor frame 10, more particularly, to the bottom of a central part of the rotor frame 10 in order to provide reinforcement. The reinforcement plate 24 includes reinforcement portions 24*b* arranged in a circumferential direction at regular intervals. The reinforcement portions 24*b* are protruded in a radial direction from the circumference of a disk portion 24*a* having a disk shape. Further, coupling holes 24*c* are formed in the disk portion 24*a*. The bolts 22*b* for coupling the axis coupling portions 22 to the rotor frame 21 are fastened to the coupling holes 24*c*. The reinforcement portions 24*b* are seated in a concave portion at the bottom of the reinforcement convex portions 21*b* of the rotor frame 21, and thus the reinforcement plate 24 is attached to the bottom of the rotor frame 21.

The axial motor described and shown above is only one embodiment for implementing the present invention and should not be construed to limit the technical spirit of the present invention. The scope of the present invention should be interpreted according to the following appended claims. Embodiments modified and changed without departing from the scope and spirit of the present invention should be construed to fall within the scope of the present invention as long as they are evident to those having ordinary skill in the art.

INDUSTRIAL APPLICABILITY

The present invention having the above structure provides an axial motor having a simple structure and an easy assembly by inserting core teeth into core teeth insertion holes arranged in a ring shape in a yoke and fixed thereto.

The invention claimed is:

1. An axial motor, comprising a stator having core teeth, insulated from each other by insulators, arranged in a ring shape and coils wound on the core teeth and a rotor having magnets arranged in a ring shape to face ends of the core teeth in an axial direction and supported by a rotor shaft at a central part of the rotor to relatively rotate around the stator, wherein the stator comprises:
    a yoke of a plate shape configured to have a doughnut shape having a central portion opened and to have core teeth insertion holes arranged in a ring shape along a circumference of the plate-shaped yoke;
    the core teeth, each configured to have core poles formed at a tip of one end and to have the other end inserted into each of the core teeth insertion holes and fixed to a yoke in an upright position;
    core teeth insulators made of insulating materials to cover respective exteriors of the core teeth so that the core poles and the other ends of the core teeth are exposed; and
    coils wound on the core teeth covered with the core teeth insulators.

2. The axial motor according to claim 1, wherein each of the core teeth is formed by stacking iron plates.

3. The axial motor according to claim 2, wherein a tip of the other end of the core tooth is cocked with the other end inserted into the core teeth insertion hole, thereby fixing the core tooth to the yoke.

4. The axial motor according to claim 3, wherein:
    locking steps are formed in each of the core teeth insertion holes on an inlet side into which the other end of the core tooth is inserted, and
    locking jaws engaged with the locking steps are formed in the other end of the core tooth.

5. The axial motor according to claim 4, wherein:
    the yoke is formed by stacking iron plates, and
    the locking steps are formed by making larger a hole, formed in the iron plates of the yoke stacked on an inlet side into which the other end of the core tooth is inserted, than a hole formed in the iron plates of the yoke stacked on the inlet side through which the tip of the other end of the core tooth is exposed.

6. The axial motor according to 3, wherein the yoke is formed by stacking iron plates.

7. The axial motor according to claim 6, wherein the yoke is formed by interconnecting a plurality of yoke pieces divided in an arc shape.

8. The axial motor according to claim 7, wherein:
    concave grooves cut up and down are formed in one end of a circumferential direction of each of the yoke pieces,
    convex portions are formed in the other end of the circumferential direction of the yoke piece and engaged with the respective concave grooves, and neighboring yoke pieces are coupled together by cocking the iron plates of the yoke at a position where the neighboring yoke pieces come into contact with each other with the convex portions engaged with the concave grooves.

9. The axial motor according to claim 8, wherein the yoke is covered with and insulated by yoke insulators so that interiors of the core teeth insertion holes are exposed.

10. The axial motor according to claim 9, wherein:
a coupling portion is formed in each of the yoke pieces and protruded in a direction of a center,
a coupling hole is formed at a tip of the coupling portion and penetrated in an axial direction, and
the yoke insulators cover interiors of the coupling portions and the coupling holes.

11. The axial motor according to claim 10, wherein the yoke insulators are formed by inserting and pressing resin with neighboring yoke pieces combined together.

12. The axial motor according to claim 1, wherein:
the rotor comprises a rotor frame of a disk shape and axis coupling portions configured to have a serration assembled with a rotor shaft at a central part of the rotor and coupled with a central part of the rotor frame, and
the magnets are attached in a ring shape to one side of the rotor frame to face the core poles of the core teeth.

13. The axial motor according to claim 12, wherein the rotor frame has reinforcement concave portions and reinforcement convex portions formed alternately and arranged in a ring shape around the axis coupling portions.

14. The axial motor according to claim 13, wherein a reinforcement plate of a disk shape is attached to the one side of the rotor frame to face the core poles of the core teeth.

15. The axial motor according to claim 14, wherein the rotor frame is formed by performing a press process on an iron plate.

16. The axial motor according to claim 15, wherein the rotor frame has through holes formed therein and arranged in a ring shape.

17. The axial motor according to claim 16, wherein blades are formed near the through holes and protruded in a direction to face the core teeth.

* * * * *